United States Patent
Dole et al.

(10) Patent No.: US 10,606,899 B2
(45) Date of Patent: Mar. 31, 2020

(54) CATEGORICALLY FILTERING SEARCH RESULTS

(71) Applicant: International Business Machines Corporation, Armonk, NY (US)

(72) Inventors: Bryn R. Dole, Sunnyvale, CA (US); Jennifer A. English, Foster City, CA (US); Dmitriy Kernasovskiy, Menlo Park, CA (US); Malous M. Kossarian, San Mateo, CA (US); Harmony Y. Shyr, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/162,379

(22) Filed: May 23, 2016

(65) Prior Publication Data

US 2017/0337257 A1   Nov. 23, 2017

(51) Int. Cl.
*G06F 17/30*   (2006.01)
*G06F 16/903*   (2019.01)
*G06F 16/33*   (2019.01)

(52) U.S. Cl.
CPC .... *G06F 16/90335* (2019.01); *G06F 16/3331* (2019.01)

(58) Field of Classification Search
CPC ......... G06F 17/30598; G06F 17/30528; G06F 16/90335; G06F 16/3331
USPC ....... 707/709, 710, 721, 722, 731, 736, 754, 707/758, 765, 767
See application file for complete search history.

(56) References Cited

U.S. PATENT DOCUMENTS

| | | | |
|---|---|---|---|
| 5,634,051 A * | 5/1997 | Thomson | G06F 17/30613 |
| 8,214,361 B1 * | 7/2012 | Sandler | 707/732 |
| 8,380,697 B2 * | 2/2013 | Benyamin | H04L 51/00 707/710 |
| 8,631,002 B2 | 1/2014 | Suresh et al. | |
| 8,843,470 B2 | 9/2014 | Li et al. | |
| 8,958,779 B2 | 2/2015 | Ramer et al. | |
| 9,195,993 B2 | 11/2015 | Ramer et al. | |
| 9,619,526 B1 * | 4/2017 | Hoover | G06F 17/3053 |
| 2008/0016036 A1 * | 1/2008 | Omoigui | G06F 17/30734 |
| 2008/0046445 A1 * | 2/2008 | Passey | G06F 17/30091 |
| 2013/0212110 A1 | 8/2013 | Stankiewicz et al. | |
| 2013/0246404 A1 * | 9/2013 | Annau | G06F 17/30672 707/723 |
| 2015/0254332 A1 * | 9/2015 | Hattori | G06F 17/3071 707/737 |

(Continued)

OTHER PUBLICATIONS

G.Abinaya et al., Event Identification in Social Media through Latent Dirichlet Allocation and Named Entity Recognition, Proceedings of IEEE International Conference on Computer Communication and Systems ICCCS14, pp. 142-146 (Year: 2014).*

(Continued)

*Primary Examiner* — Greta L Robinson
(74) *Attorney, Agent, or Firm* — Zilka-Kotab, P.C.

(57) ABSTRACT

A computer-implemented method according to one embodiment includes identifying a search query, determining a first set of categories associated with the search query, determining a second set of categories associated with preliminary results of the search query, and filtering the preliminary results of the search query based on an analysis utilizing the first set of categories and the second set of categories.

19 Claims, 6 Drawing Sheets

(56) References Cited

U.S. PATENT DOCUMENTS

2015/0356072 A1* 12/2015 He .................... G06F 16/3331
                                                           704/9
2017/0228654 A1*  8/2017 Skupin ................ G06F 17/211
2017/0308613 A1* 10/2017 Zhu ................... G06F 17/30867

OTHER PUBLICATIONS

S. Bhutada et al., Latent Dirichlet Allocation based Multilevel Classification, 2014 International Conference on Control, Instrumentation, Communication and Computational Technologies (ICCICCT), pp. 1020-1024 (Year: 2014).*

* cited by examiner

CATEGORICALLY FILTERING SEARCH RESULTS

BACKGROUND

The present invention relates to performing data searches, and more specifically, this invention relates to filtering results of data searches based on associated topics.

The ability to search for data within large data stores is a valuable tool. However, many times search results include data that is of little or no value to a user that initiated a search. It is therefore desirable to improve a relevancy of returned search results.

SUMMARY

A computer-implemented method according to one embodiment includes identifying a search query, determining a first set of categories associated with the search query, determining a second set of categories associated with preliminary results of the search query, and filtering the preliminary results of the search query based on an analysis utilizing the first set of categories and the second set of categories.

According to another embodiment, a computer program product for categorically filtering search results comprises a computer readable storage medium having program instructions embodied therewith, wherein the computer readable storage medium is not a transitory signal per se, and where the program instructions are executable by a processor to cause the processor to perform a method comprising identifying a search query, utilizing the processor, determining, utilizing the processor, a first set of categories associated with the search query, determining, utilizing the processor, a second set of categories associated with preliminary results of the search query, and filtering, utilizing the processor, the preliminary results of the search query based on an analysis utilizing the first set of categories and the second set of categories.

A system according to another embodiment includes a processor and logic integrated with and/or executable by the processor, the logic being configured to identify a search query, determine a first set of categories associated with the search query, determine a second set of categories associated with preliminary results of the search query, and filter the preliminary results of the search query based on an analysis utilizing the first set of categories and the second set of categories.

Other aspects and embodiments of the present invention will become apparent from the following detailed description, which, when taken in conjunction with the drawings, illustrate by way of example the principles of the invention.

DETAILED DESCRIPTION

Figure 1:
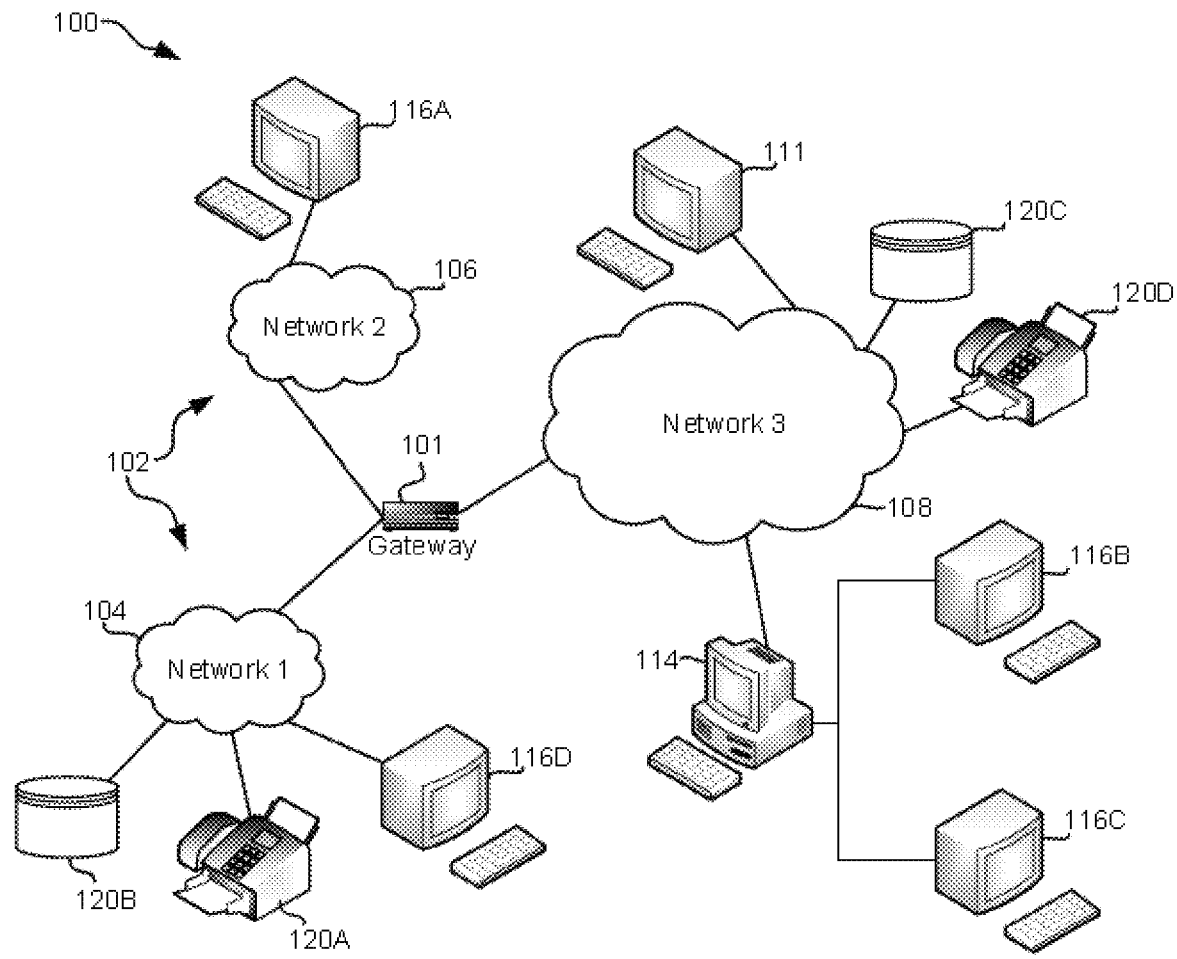
FIG. 1 illustrates a network architecture, in accordance with one embodiment.

The following description discloses several preferred embodiments of systems, methods and computer program products for categorically filtering search results. Various embodiments provide a method to identify categories associated with both a search query and filter search results based on a comparison of the categories.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for categorically filtering search results.

In one general embodiment, a computer-implemented method includes identifying a search query, determining a first set of categories associated with the search query, determining a second set of categories associated with preliminary results of the search query, and filtering the preliminary results of the search query based on an analysis utilizing the first set of categories and the second set of categories.

In another general embodiment, a computer program product for categorically filtering search results comprises a computer readable storage medium having program instructions embodied therewith, wherein the computer readable storage medium is not a transitory signal per se, and where the program instructions are executable by a processor to cause the processor to perform a method comprising identifying a search query, utilizing the processor, determining, utilizing the processor, a first set of categories associated with the search query, determining, utilizing the processor, a second set of categories associated with preliminary results of the search query, and filtering, utilizing the processor, the preliminary results of the search query based on an analysis utilizing the first set of categories and the second set of categories.

In another general embodiment, a system includes a processor and logic integrated with and/or executable by the processor, the logic being configured to identify a search query, determine a first set of categories associated with the search query, determine a second set of categories associated with preliminary results of the search query, and filter the preliminary results of the search query based on an analysis utilizing the first set of categories and the second set of categories.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116B-C. User devices 116A-D may also be connected directly through one of the networks 104, 106, 108. Such user devices 116A-D may include a desktop computer, lap-top computer, hand-held computer, printer or any other type of logic. It should be noted that a user device 111 may also be directly coupled to any of the networks, in one embodiment.

A peripheral or series of peripherals 120A-D, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
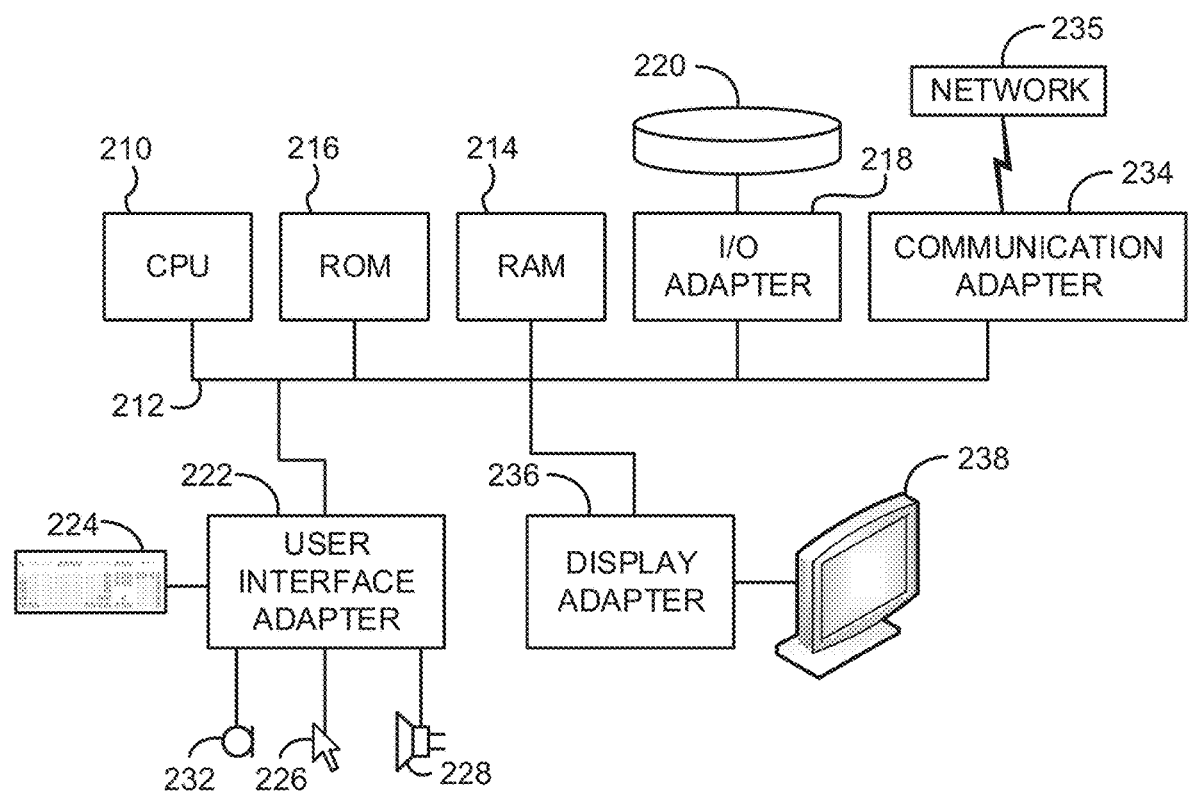
FIG. 2 shows a representative hardware environment that may be associated with the servers and/or clients of FIG. 1, in accordance with one embodiment.

FIG. 2 shows a representative hardware environment associated with a user device 116A-D and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
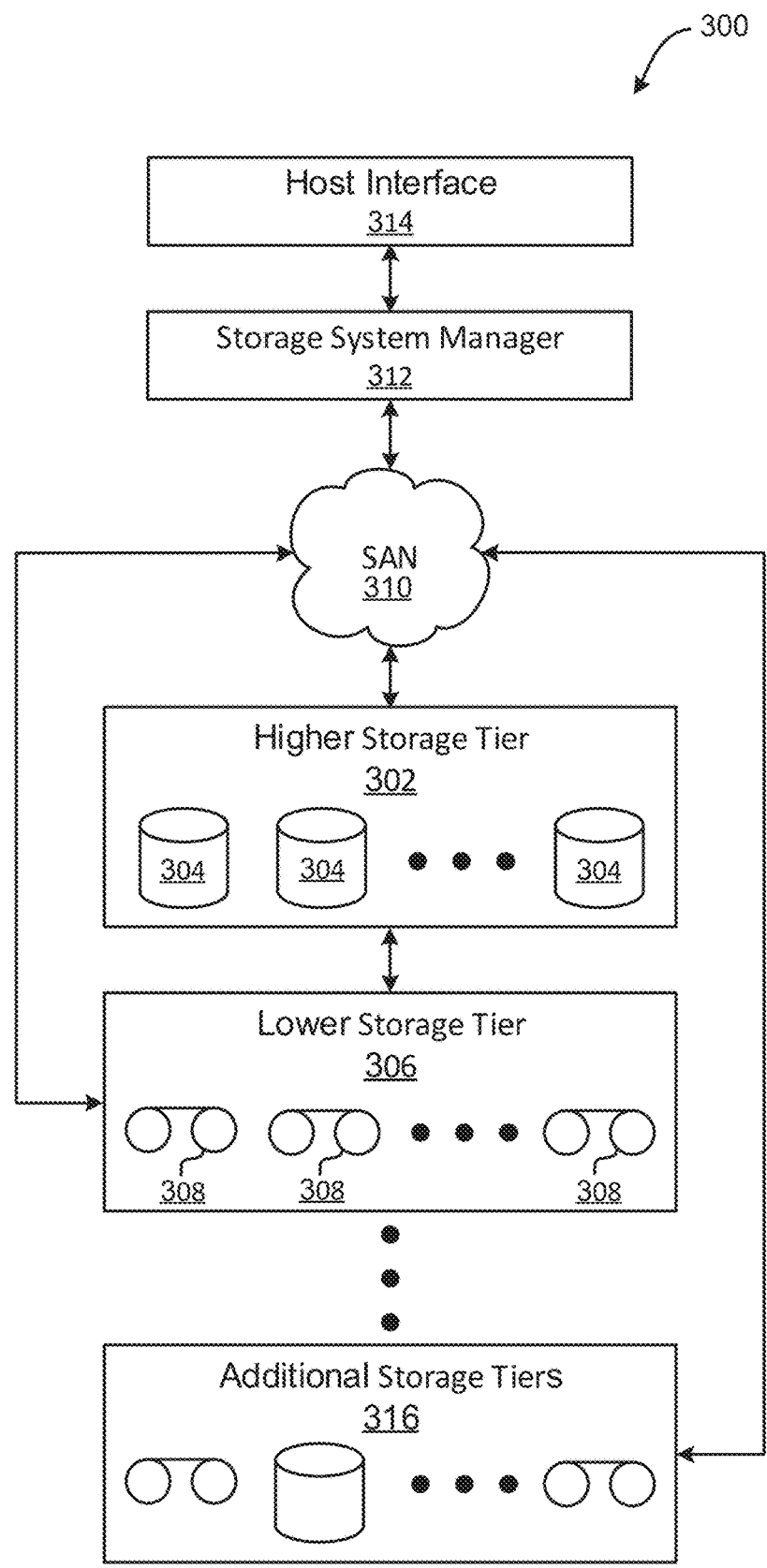
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
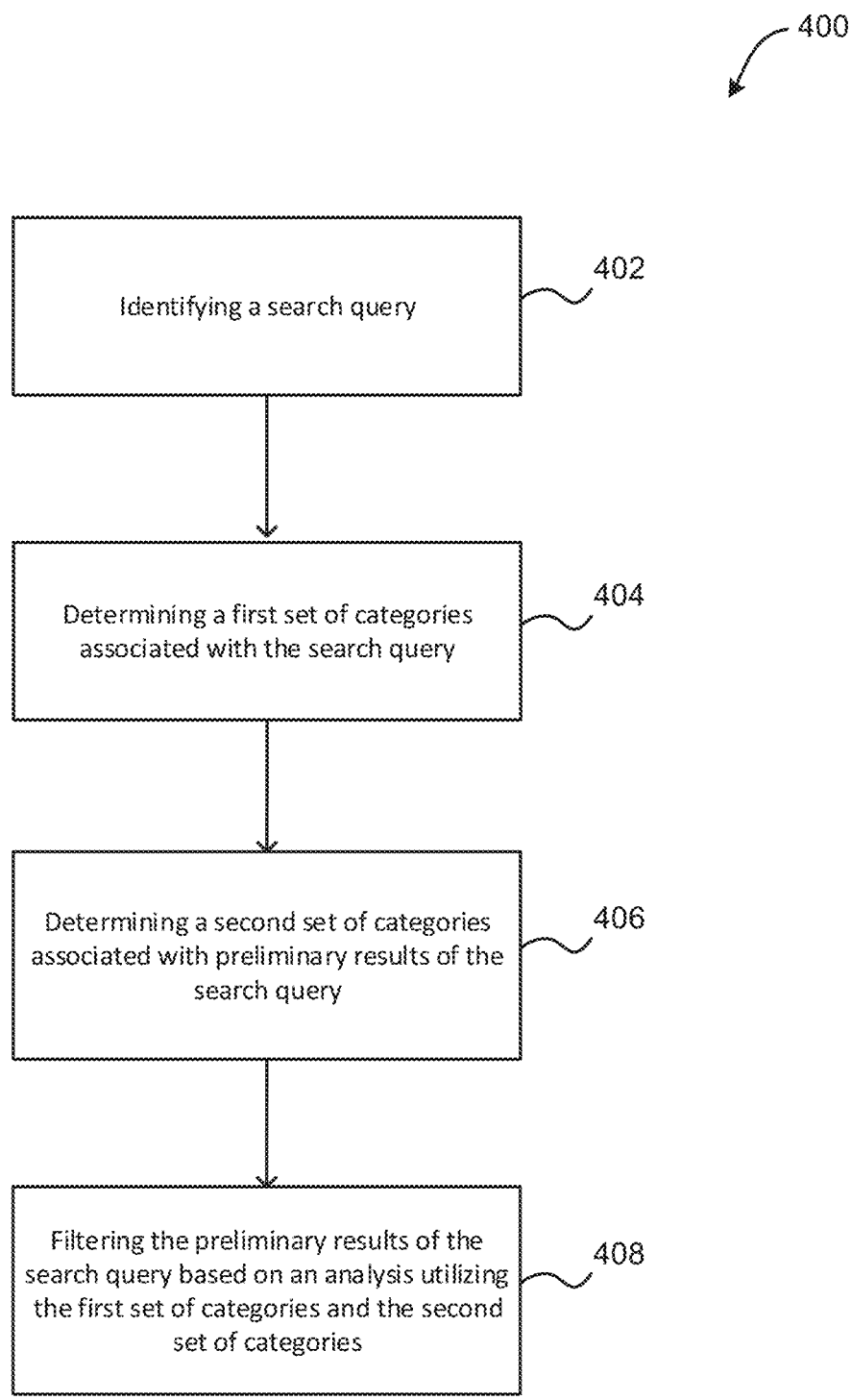
FIG. 4 illustrates a method for categorically filtering search results, in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a search query is identified. In one embodiment, the search query may include one or more terms. For example, the search query may include one or more words, alphanumeric characters, symbols, strings, etc. In another embodiment, the search query may be input by a user. For example, the search query may be input by a user into one or more fields of a graphical user interface (GUI). In yet another embodiment, the search query may be part of a network search request, an internet search request, a search of a predetermined data store, etc. In still another embodiment, the search query may be received by a computing device. For example, the search query may be received by a server, a cloud computing device, a parallel computing device, a distributed computing device, a mobile computing device, a personal computing device, etc.

Further, as shown in FIG. 4, method 400 may proceed with operation 404, where a first set of categories associated with the search query are determined. In one embodiment, each of the first set of categories may include one or more words that describe one or more aspects of the search query. For example, the first set of categories may include one or more topics indicated by the search query, one or more types of data associated with the search query, etc. In another embodiment, the first set of categories may be determined by categorizing one or more terms (e.g., words, etc.) within the search query.

Further, in one embodiment, the first set of categories may be determined utilizing an inference map. For example, a reverse lookup may be performed for the search query using the dynamic inference map in order to determine the first set of categories. In another example, the results of the reverse lookup may be used to map the search query onto a predetermined set of categories, such that the first set of categories is determined using the predetermined set of categories.

Further still, in one embodiment, a confidence level may be associated with each category within the first set of categories. For example, each category resulting from the reverse lookup may have an associated confidence score indicating a strength of a match between the category and the search query. In another embodiment, each of the categories within the predetermined set of categories may be predetermined. For example, the predetermined set of categories may be curated and edited by one or more users. In yet another embodiment, each of the first set of categories may include a slash tag.

Further still, as shown in FIG. 4, method 400 may proceed with operation 406, where a second set of categories associated with preliminary results of the search query are determined. In one embodiment, determining the second set of categories associated with preliminary results of the search query may include identifying the preliminary results of the search query. For example, the preliminary results may be obtained by performing a search utilizing the search query. In another example, the standard search may be performed utilizing a search index. In yet another example, the preliminary results may include one or more of a plurality of web page uniform resource links (URLs), a plurality of stored documents, a plurality of textual data, etc.

In addition, in one embodiment, determining the second set of categories associated with preliminary results of the search query may include extracting textual data from each of the preliminary results of the search query. For example, the extracted textual data may include one or more words, strings, etc. found within the preliminary results. In another embodiment, the textual data may be extracted by crawling the preliminary results of the search query. For example, the preliminary results of the search query may be crawled after the search is performed. In another example, the preliminary results of the search query may be crawled as part of a corpus of data before the search is performed. In yet another example, each of the plurality of results may refer to a web page via a URL, and each web page may be crawled in order to extract the textual data.

Furthermore, in one embodiment, the extracted textual data may include one or more key words. For example, the one or more key words may be identified using one or more applications (e.g., latent dirichlet allocation (LDA) analysis, etc.). In another embodiment, the second set of categories associated with preliminary results of the search query may be determined based on the textual data. For example, the second set of categories may be determined for each of the preliminary results for which textual data has been extracted. In another embodiment, LDA analysis may be used to determine the one or more categories. For example, LDA analysis may be used to analyze each preliminary result of the search query by parsing the results and pulling out key words.

Further still, in one embodiment, one or more topic vectors may be created that map the key words onto a set of categories. In another embodiment, each category of the set of categories may be predetermined. For example, the predetermined set of categories may be curated and edited by one or more users. In yet another embodiment, the categories may be the same as the categories used to determine the first set of categories associated with the search query. For example, the same predetermined set of categories may be used to determine both the first set of categories and the second set of categories.

Also, as shown in FIG. 4, method 400 may proceed with operation 408, where the preliminary results of the search query are filtered based on an analysis utilizing the first set of categories and the second set of categories. In one embodiment, filtering the preliminary results may include removing a subset of the preliminary results according to the analysis. In another embodiment, the analysis may include comparing the first set of categories to the second set of categories. For example, matching categories may be determined between the first set of categories and the second set of categories as a result of the comparing. In another embodiment, each matching category may include an associated confidence score/level.

Additionally, in one embodiment, a predetermined portion of the first set of categories may be determined for the search query. For example, the top 10 categories may be determined for the search query (e.g., the top 10 categories with the highest confidence scores, etc.). In another embodiment, this predetermined portion of the first set of categories may be compared to the second set of categories associated with preliminary results of the search query. In yet another embodiment, for each for the second set of categories, a number of categories matching one or more of the predetermined number of the first set of categories may be determined, as well as confidence levels associated with each matching category. In still another embodiment, for each for the second set of categories, a number of categories matching one or more of the first set of categories may be determined, as well as confidence levels associated with each matching category.

Further, in one embodiment, filtering the preliminary results of the search query may include returning only a portion of the preliminary results of the search query to a user, based on the analysis. For example, for each of the preliminary results of the search query, the result may be ranked according to matching categories and associated confidence levels determined between the first set of categories and the categories determined for the result. In another example, results having higher confidence levels will be ranked higher than those with lower confidence levels, and only a predetermined number of ranked preliminary results (e.g., the top N preliminary results, etc.) may be returned.

In another embodiment, an overall match score may be determined for each of the preliminary results based on their matching categories and associated confidence levels. In yet another embodiment, each of the preliminary results may be analyzed and returned only if the overall match score exceeds a threshold. In still another embodiment, the filtered results may be returned to a user (e.g., as search results, etc.).

In this way, high ranking preliminary search results that are categorized differently than the query may be avoided/filtered in provided search results. This may increase an overall relevance of search results. In one embodiment, such improved results may be stored and used to refine further searches, which may reduce an amount of processing performed during future searches, which may in turn increase performance.

Figure 5:
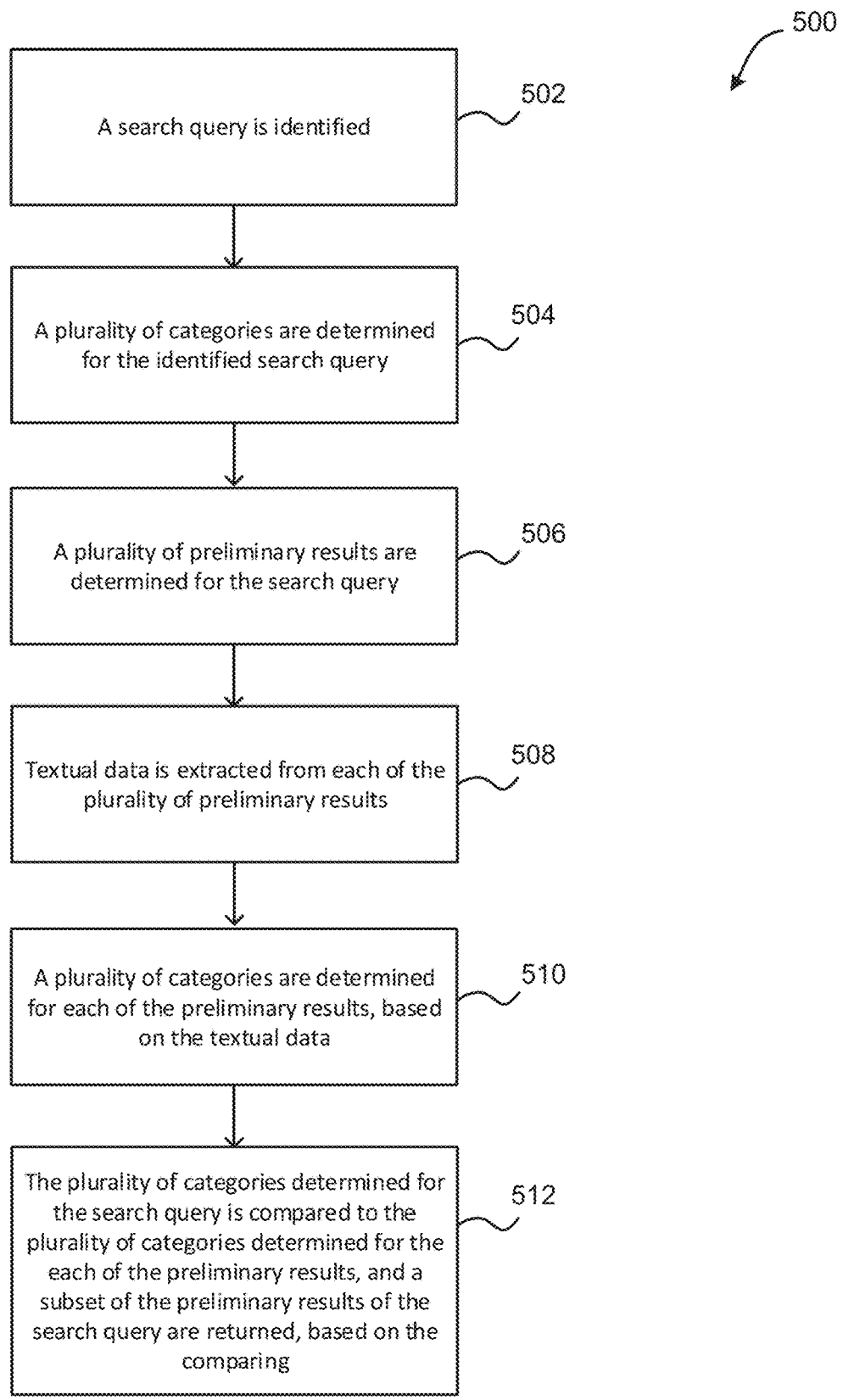
FIG. 5 illustrates a method for filtering search results, in accordance with one embodiment.

Now referring to FIG. 5, a flowchart of a method 500 for filtering search results is shown according to one embodiment. The method 500 may be performed in accordance with the present invention in any of the environments depicted in FIGS. 1-4 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a search query is identified. In one embodiment, the search query may include one or more terms input by a user that are used to perform a search of one or more predetermined sources of data. Additionally, method 500 may proceed with operation 504, where a plurality of categories are determined for the identified search query. In one embodiment, the one or more categories may be determined utilizing a dynamic inference map. In another embodiment, the one or more categories may be selected from a predetermined list of categories.

Additionally, in one embodiment, the one or more categories may include one or more slash tags. For example, each slash tag groups identifiers of a location of each of the plurality of documents (e.g., hyperlinks, pointers, etc.) within a centralized location. In another example, the slash tag may include identifiers of one or more of a plurality of data. In yet another example, the slash tag may include a database, a table, a textual document, or any other data structure or document grouping the plurality of data. In still another embodiment, the slash tag may be unique to a predetermined subject. In another embodiment, the slash tags may include defined subjects of high quality data. For example, slash tags may be defined for a set of subjects that divide up information on the Internet, defining high quality sources of text.

Further, method 500 may proceed with operation 506, where a plurality of preliminary results are determined for the search query. In one embodiment, the plurality of preliminary results may be determined by performing a search for the search query within the one or more predetermined sources of data. Further still, method 500 may proceed with operation 508, where textual data is extracted from each of the plurality of preliminary results. In one embodiment, each of the plurality of preliminary results may include a uniform resource link (URL) pointing to a web page, and the textual data may be extracted from each of the web pages that are pointed to by the results URLs.

Also, method 500 may proceed with operation 510, where a plurality of categories are determined for each of the preliminary results, based on the textual data. In one embodiment, each of the plurality of categories may include one or more key words determined from the extracted data by performing a latent dirichlet allocation (LDA) analysis on the extracted data. For example, performing the LDA analysis may include reading in and splitting up extracted data into text words, where only words that existed in two or more instances of extracted data may be analyzed. In another embodiment, performing the LDA analysis may include producing a dictionary of these words, which may provide a unique integer for each word. In another embodiment, performing the LDA analysis may include converting the one or more documents into a bag-of-words array, where only the word, represented as an integer, and the number of times it was used is saved. These bag-of-word arrays may then be analyzed using LDA analysis to find the resulting topic vectors.

Additionally, in one embodiment, the LDA analysis may be performed separately for each subject, correlating to the number of slash tags utilized in the example. In another embodiment, the production may be managed on computer clusters. In yet another embodiment, each example job may produce a set of unit topic vectors, with words (as integers) and frequencies.

Furthermore, method 500 may proceed with operation 512, where the plurality of categories determined for the search query is compared to the plurality of categories determined for the each of the preliminary results, and a subset of the preliminary results of the search query are returned, based on the comparing. In one embodiment, each of the preliminary results in the subset may include a URL pointing to a web page that has determined categories matching a predetermined number of categories determined for the identified search query with a predetermined confidence. In another embodiment, a score may be calculated for each of the preliminary results based on matching categories and associated confidence scores, and the subset may be determined by selecting a predetermined number of preliminary results having scores exceeding a threshold score. In this way, only results that categorically match the search query may be returned.

Figure 6:
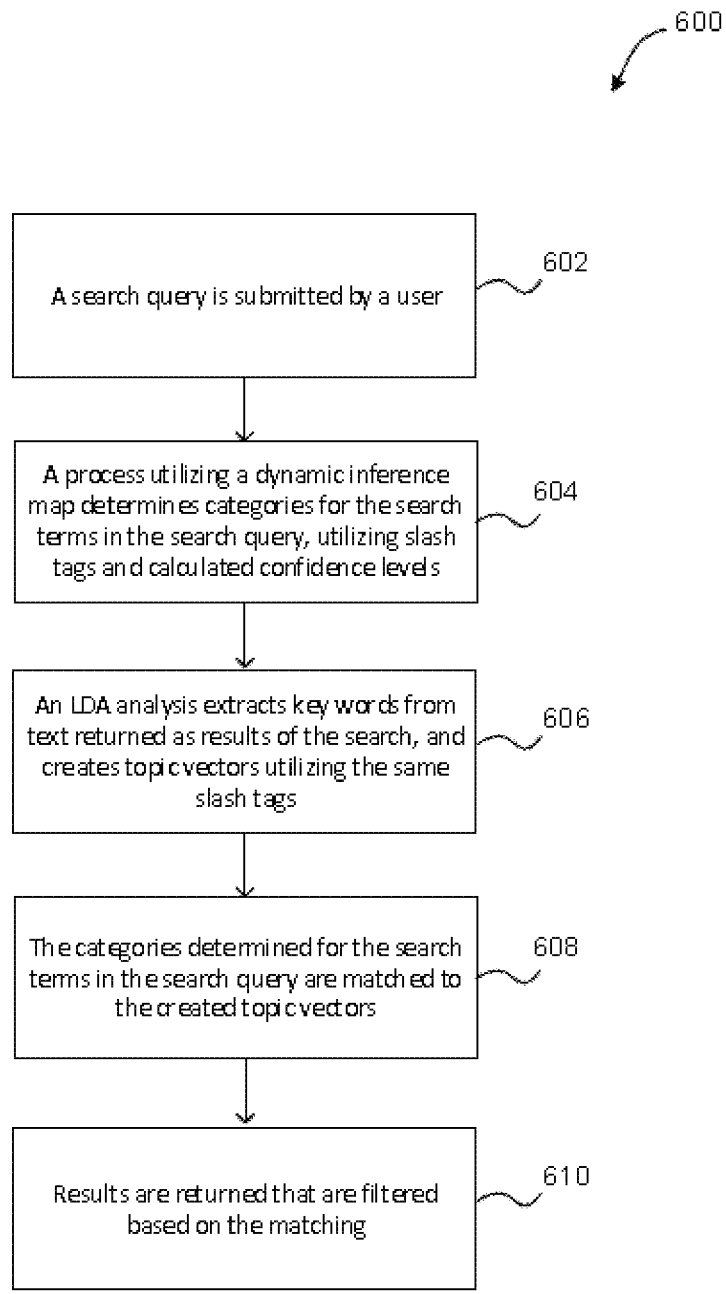
FIG. 6 illustrates a method for returning search results based on category matching, in accordance with one embodiment.

Now referring to FIG. 6, a flowchart of a method 600 for returning search results based on category matching is shown according to one embodiment. The method 600 may be performed in accordance with the present invention in any of the environments depicted in FIGS. 1-5, among others, in various embodiments. Of course, more or less operations than those specifically described in FIG. 6 may be included in method 500, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a search query is submitted by a user. Additionally, method 600 may initiate with operation 604, where a process utilizing a dynamic inference map determines categories for the search terms in the search query, utilizing slash tags and calculated confidence levels. Further, method 600 may initiate with operation 606, where an LDA analysis extracts key words from text returned as results of the search, and creates topic vectors utilizing the same slash tags. Further still, method 600 may initiate with operation 608, where the categories determined for the search terms in the search query are matched to the created topic vectors. Also, method 600 may initiate with operation 610, where results are returned that are filtered based on the matching.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a search query;
   determining a first set of categories associated with the search query, where each category of the first set of categories includes one or more words that describe one or more aspects of the search query, and each of the first set of categories associated with the search query includes a slash tag unique to a predetermined subject, the slash tag including a grouping of identifiers of locations of a plurality of documents;
   determining a second set of categories associated with preliminary results of the search query; and
   filtering the preliminary results of the search query, including removing a subset of the preliminary results of the search query based on a comparison of the first set of categories to the second set of categories.

2. The computer-implemented method of claim 1, wherein a reverse lookup is performed for the search query using a dynamic inference map in order to determine the first set of categories, and determining the second set of categories associated with preliminary results of the search query includes:

identifying the preliminary results of the search query by performing a search utilizing the search query and a search index, extracting textual data from each of the preliminary results of the search query by crawling the preliminary results of the search query, identifying one or more key words within the extracted textual data, utilizing latent dirichlet allocation (LDA) analysis, and mapping the one or more key words onto a predetermined set of categories to determine the second set of categories.

3. The computer-implemented method of claim 1, wherein determining the first set of categories includes:

categorizing one or more words within the search query, and performing a reverse lookup for the search query using a dynamic inference map to determine the first set of categories, wherein each category of the first set of categories has an associated confidence score indicating a strength of a match between the category and the search query.

4. The computer-implemented method of claim 1, wherein filtering the preliminary results of the search query includes:

ranking each of the preliminary results of the search query according to matching categories and associated confidence levels determined between the first set of categories and the second set of categories, and returning a predetermined number of the ranked preliminary results.

5. The computer-implemented method of claim 1, wherein filtering the preliminary results includes:

comparing the first set of categories to the second set of categories to determine matching categories, where each of the matching categories includes an associated confidence score, determining an overall match score for each the preliminary results of the search query, utilizing to the matching categories and the associated confidence score for each of the matching categories, and for each of the preliminary results of the search query, returning the preliminary result in response to determining that the overall match score for the preliminary result exceeds a threshold.

6. The computer-implemented method of claim 1, wherein filtering the preliminary results includes returning each of the preliminary results of the search query only if its overall match score exceeds a predetermined threshold.

7. The computer-implemented method of claim 1, wherein determining the second set of categories associated with preliminary results of the search query includes extracting textual data from each of the preliminary results of the search query, where:

the preliminary results of the search query include a plurality of URLs, and the textual data extracted includes data extracted from a plurality of web pages pointed to by the plurality of URLs.

8. The computer-implemented method of claim 7, wherein determining the second set of categories associated with preliminary results of the search query includes determining a plurality of key words from the textual data, utilizing latent dirichlet allocation (LDA) analysis.

9. The computer-implemented method of claim 8, wherein determining the second set of categories associated with preliminary results of the search query includes mapping the plurality of key words to a predetermined set of categories, where each of the plurality of key words maps to one or more categories of the predetermined set of categories.

10. A computer program product for categorically filtering search results, the computer program product comprising a computer readable storage medium having program instructions embodied therewith, wherein the computer readable storage medium is not a transitory signal per se, the program instructions executable by a processor to cause the processor to perform a method comprising:

receiving a search query, utilizing the processor;

determining, utilizing the processor, a first set of categories associated with the search query, where each category of the first set of categories includes one or more words that describe one or more aspects of the search query, and each of the first set of categories associated with the search query includes a slash tag unique to a predetermined subject, the slash tag including a grouping of identifiers of locations of a plurality of documents;

determining, utilizing the processor, a second set of categories associated with preliminary results of the search query; and filtering, utilizing the processor, the preliminary results of the search query, including removing a subset of the preliminary results of the search query based on a comparison of the first set of categories to the second set of categories.

11. The computer program product of claim 10, wherein a reverse lookup is performed for the search query using a dynamic inference map in order to determine the first set of categories.

12. The computer program product of claim 10, wherein a confidence level is associated with each category within the first set of categories.

13. The computer program product of claim 10, wherein determining the second set of categories associated with preliminary results of the search query includes identifying the preliminary results of the search query by performing a search utilizing the search query.

14. The computer program product of claim 10, wherein filtering the preliminary results includes removing a subset of the preliminary results of the search query according to a comparison of the first set of categories to the second set of categories.

15. The computer program product of claim 10, wherein filtering the preliminary results includes determining an overall match score for each of the preliminary results of the search query.

16. The computer program product of claim 15, wherein filtering the preliminary results includes returning each of the preliminary results of the search query only if its overall match score exceeds a predetermined threshold.

17. The computer program product of claim 10, wherein determining the second set of categories associated with preliminary results of the search query includes extracting textual data from each of the preliminary results of the search query.

18. The computer program product of claim 17, wherein determining the second set of categories associated with preliminary results of the search query includes determining a plurality of key words from the textual data, utilizing latent dirichlet allocation (LDA) analysis.

19. A system, comprising:

a processor; and logic integrated with the processor, executable by the processor, or integrated with and executable by the processor, the logic being configured to:

receive a search query;

determine a first set of categories associated with the search query, where each category of the first set of categories includes one or more words that describe one or more aspects of the search query, and each of the first set of categories associated with the search query includes a slash tag unique to a predetermined subject, the slash tag including a grouping of identifiers of locations of a plurality of documents;

determine a second set of categories associated with preliminary results of the search query; and filter the preliminary results of the search query, including removing a subset of the preliminary results of the search query based on a comparison of the first set of categories to the second set of categories.

\* \* \* \* \*